Dec. 20, 1966     A. B. MUSICHUK     3,292,947

KNOCK-DOWN BICYCLE

Filed March 4, 1965

INVENTOR.
ALEXANDER B. MUSICHUK
BY

ATTORNEYS

@@ -0,0 +1 @@
United States Patent Office 3,292,947
Patented Dec. 20, 1966

3,292,947
KNOCK-DOWN BICYCLE
Alexander B. Musichuk, Parma, Ohio, assignor to The M. T. & D. Company, a corporation of Ohio
Filed Mar. 4, 1965, Ser. No. 437,042
15 Claims. (Cl. 280—287)

My invention relates to knock-down bicycles, that is, to bicycles which may be separated into parts for ready storage, transportation and the like.

An object of my invention is to provide an improved means for separating a bicycle into two portions so that the two separated portions may be readily stored, transported, or handled in a facile manner.

Another object is the provision of a quicker and easily manipulated mechanism for separating and again connecting two separable parts of a bicycle frame.

Another object is the provision for improved rigidity and strength afforded by the joint between two parts of a separable bicycle frame.

Another object is the provision for improvement in the means for joinder and disjoinder of separable parts of a bicycle frame.

Other objects and a fuller understanding of the invention may be had by referring to the following description and claims, taken in conjunction with the accompanying drawings, in which:

Figure 1:
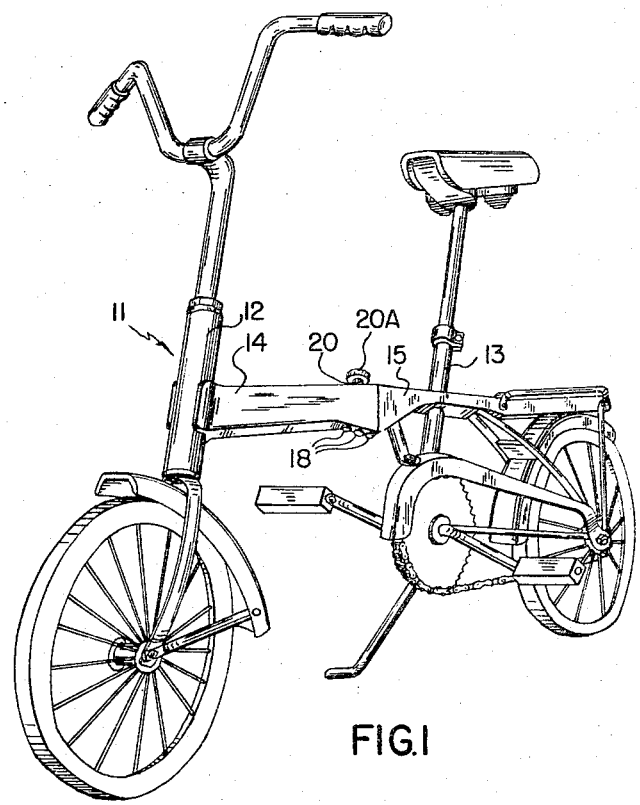
FIGURE 1 is a perspective view of a bicycle showing the preferred form of my invention embodied therein.

In the drawing, the bicycle frame of my bicycle is denoted generally by the reference character 11. The frame 11 has a steering post 12 at the forward end and a seat post 13 rearwardly thereof, the posts 12 and 13 being in a generally upright plane.

Joining the steering post 12 and seat post 13 is a reach bar made up of a front portion 14 and a rearward portion 15 which, joined together, form the reach bar of the frame. In FIGURE 1, the forward portion 14 and rearward portion 15 are shown joined together to form the rigid reach bar of the frame.

Figure 2:
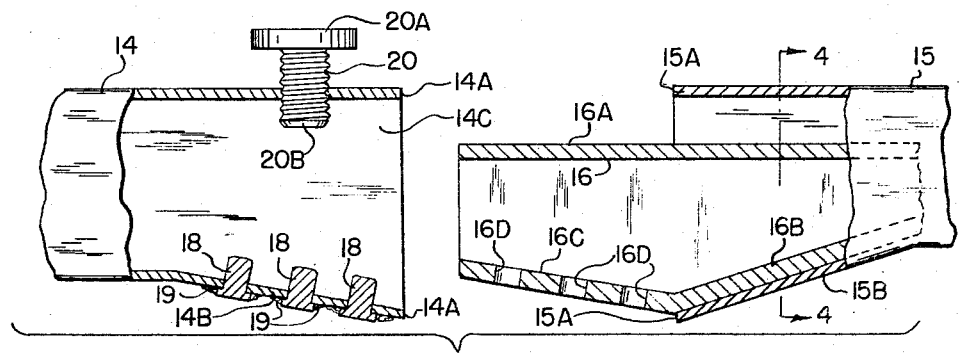
FIGURE 2 is an exploded and enlarged view of the parts making up the joint or connection between the separable parts of the frame of the bicycle shown in FIGURE 1 but showing the parts in separated position.
Figure 3:
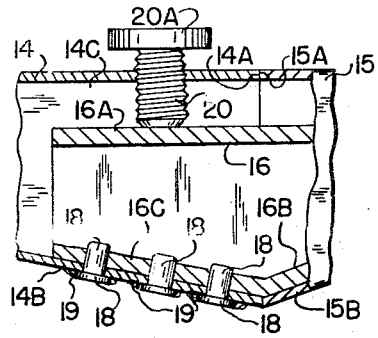
FIGURE 3 is a view somewhat similar to that of FIGURE 2 but showing the parts of the separable frame in joined or connected position.

The opposing ends of the portions 14 and 15 are disposed to abut each other upon the portions 14 and 15 being joined together. The portion 14 has an end face 14A disposed normal to the axis of the portion 14 and the portion 15 has an end face 15A disposed normal to the axis of the portion 15. The portions 14 and 15 at the locations of the end faces 14A and 15A, respectively, are generally rectangular in cross-section and there is a bearing interengagement between the end faces 14A and 15A around the extent of the rectangular configuration. As seen in FIGURES 2 and 3, the forward reach portion 14 has an inclined bottom wall 14B extending rearwardly and downwardly in the neighborhood of the open end of the portion 14. As seen in the drawing, the rearward end of the portion 14, facing rearwardly, is open to form a socket or female part 14C, the cross-sectional area of the socket 14C being largest at the rearwardmost end of the portion 14.

Figure 4:
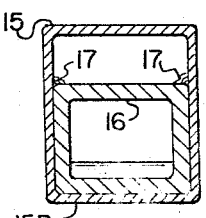
FIGURE 4 is a cross-sectional view through the line 4—4 of FIGURE 2.

The reach portion 15 also has an inclined bottom wall 15B which extends downwardly and forwardly toward the forward open end of the portion 15. As seen in the drawing, the forward end of portion 15 is also open. Mounted within the open end of the portion 15 is a tongue or male part 16, the tongue 16 being secured by welding 17 to the inner wall of the portion 15 as seen in FIGURE 4. The rearward end of the tongue 16 has a rear inclined bottom wall 16B which complements and engages the bottom wall 15B of the portion 15. The tongue 16 also has a front inclined bottom wall 16C extending upwardly and rearwardly at an angle to the portion 16B. The forward portion, generally the forward half portion, of tongue 16 protrudes forwardly from the open end of the portion 15. The inclined bottom wall 16C complements the bottom wall 14B of portion 14 so as to interengage therewith as in FIGURE 3.

The cross-sectional area of the tongue 16 is generally rectangular in shape as seen in FIGURE 4. It has a top surface 16A extending in a flat, generally horizontal plane along its length. Extending through the wall 16C are three openings or dwells 16D spaced longitudinally of the tongue, the axis of each opening 16D being normal to the wall 16C.

Extending through the wall 14B of the portion 14 are three studs or projections 18 spaced longitudinally of the portion 14, the axis of each stud 18 being normal to the wall 14B. These studs 18 are secured by means of welding 19 to the bottom wall 14B. The cross-sectional area of the respective studs 18 is such that they complementarily fit in the respective openings 16D in the wall 16C of tongue 16. The fit is such that the wall 16C may be readily moved upwardly and downwardly so as to position the studs 18 in the respective openings 16D and to be withdrawn therefrom depending on the elevation of the tongue 16 relative to the bottom wall 14B. As the axes of studs 18 and openings 16D are similarly normal to complementary walls 16C and 14B, the tongue 16 is drawn by a camming action into the socket 14C upon the tongue being moved downwardly toward the studs. Similarly the tongue is cammingly moved outwardly of the socket upon the tongue being moved upwardly along the studs.

It is to be noted that the height or vertical dimension of the tongue 16 is such that there is a space within the socket 14C of portion 14 above the top surface 16A and below the top wall of portion 14. This space is such that the tongue 16 may be raised upwardly above the studs 18 within the socket 14C so as to clear the tops of the respective studs 18. When the studs 18 are thus cleared of openings 16D, the tongue 16 may be inserted into and withdrawn from socket 14C.

Extending through and threadably engaged to the top wall of portion 14 above the studs 18 is a threaded bolt 20 which has a knob or handle 20A disposed above the portion 14 in a position to be manipulated by the manual turning of the bolt 20. The lower end 20B of the bolt 20, preferably cup-shaped as on a set screw, is adapted to bearingly engage upon the top surface 16A of the tongue 16 upon turning of the bolt 20 downwardly. Upon turning the bolt 20 downwardly as shown in FIGURE 3, the tongue is firmly held down in the socket 14C and with the studs retained within the respective openings 16D. As seen in FIGURE 3, the two portions 14 and 15 of the reach bar are firmly held and locked in a joined connection.

When it is desired to separate the portions 14 and 15 of the reach bar, the bolt 20 is turned so as to raise the end of 20B upwardly away from the top surface 16A a sufficient distance that the tongue 16 may be raised upwardly so that the studs 18 are cleared and thus permit the tongue 16 to be withdrawn from the socket 14C. After withdrawal, the parts are shown in the disconnected position of FIGURE 2. When in this disconnected position, the forward part of the bicycle and rearward part of the bicycle may be separately handled and may be stored or transported with greater ease and economy of space than when the portions 14 and 15 are connected as in FIGURES 1 and 2.

Figure 5:
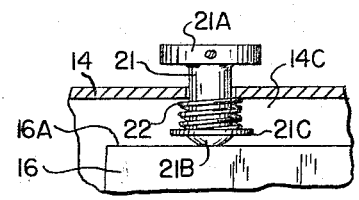
FIGURE 5 is a view showing the modified form of the joining structure embodying my invention.

In FIGURE 5, there is shown a modification of the arrangement in that instead of the threaded bolt 20 there is utilized a pin 21 adapted to freely move upwardly and downwardly in an opening in the top wall of portion 14. A coil spring 22 is interposed between the bottom surface of the top wall portion 14 and a flange 21C provided on the pin 21. The bottom end 21B is disposed to engage the top surface 16A of the tongue 16 and to firmly hold it downwardly under the resilient bias of the spring 22. A knob 21A on the upper end of the pin 21 may be grasped by the fingers of the operator so as to raise up on the pin 21 against the bias of the spring 22 and thus to raise up the pin 21 sufficiently that the tongue 16 may be raised upwardly to clear the studs 18 and thus to permit withdrawal of the tongue 16 from the socket 14C.

The present invention permits the handling of a bicycle and its storage and transportation, such as in an automobile, with considerable ease and with a minimum of space requirements.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a bicycle frame having a steering post and a seat post, the improvement of a separable reach bar extending between and joining said posts, said reach bar having a first portion carried by and connected to the steering post and a second portion carried by and connected to said seat post, one of said portions having a female part and the other of said portions having a male part, said parts being non-circular in cross-section and being interengageable to join said portions and to prevent rotation of one of said portions relative to the other on their respective axes, said female part having disposed along the bottom wall thereof a boss projecting inwardly thereof, said male part having a recess in the bottom wall thereof dimensioned for complementarily accommodating said boss, the height of said boss above said bottom wall of female part being so related to the vertical thickness of said male part above said boss that said male part may be inserted longitudinally to locate the said recess above said boss and the male part moved toward said bottom wall of the female part to position said boss in said recess for preventing longitudinal withdrawal of the male part from said female part, and a locking member carried by said female part and selectively movable inwardly of said female part downwardly against said male part to maintain the said boss in the said recess and thereby lock the male part in said female part.

2. The improvement as claimed in claim 1 and in which said locking member is a threaded member threadably engaged to the top wall of said female part, having a handle extending upwardly therefrom for manual rotation of the threaded member, and having an inner end adapted to bear on the upper wall of the male part upon turning down the threaded member.

3. The improvement as claimed in claim 1 and in which said locking member is a spring-biased pin carried by said female part and resiliently urged downwardly, having a handle extending upwardly therefrom for raising the pin against said bias, and having an inner end adapted to bear on the upper wall of the male part.

4. In a bicycle frame having a separable reach bar, a coupling construction for ready coupling and uncoupling forward and rearward portions of said reach bar, said portions having male and female parts adapted to telescopically interfit upon alignment of said portions and movement toward each other, said male part having a smaller cross-sectional area than said female part to provide a space within the female part between opposed sides of the male part and female part disposable on one side of the male part, said female part having a projection extending laterally thereof into the open space within the female part, said male part having a dwell in an opposite side thereof for receiving said projection, said projection in said dwell being disposed at an angle to the axis of the aligned portions of the reach bar to prevent withdrawal of the male part from the female part upon the said projection being disposed in said dwell, the said space within the female part on said one side of the male part being sufficient to permit the male part to enter the female part in moving the parts toward each other and to clear said projection for enabling the said dwell to register with said projection, said male part and female part being laterally movable toward each other upon the said dwell registering with said projection to position the projection in said dwell, and locking means carried by said female part and selectively movable laterally therein against said one side of said male part to hold the male part laterally toward a side of said female part for retaining the projection in said dwell and movable laterally away from said opposite side of the male part to permit the male part to move sufficiently away from said projection to clear the same and permit withdrawal of the male part from the female part.

5. A frame as claimed in claim 4 and in which said projection is comprised of a plurality of studs spaced apart longitudinally of the female part and projecting inwardly thereof, and said dwell is comprised of an equal plurality of openings in the wall of the male part each adapted to complementarily accommodate one of said studs upon registration of the studs and openings the lateral movement of the male and female parts relative to each other.

6. A bicycle frame having a reach bar extending between the steering post and seat post thereof, said reach bar being of two separable portions adapted to be aligned and to be selectively coupled together and uncoupled, the ends of said portions directed toward each other having male and female parts telescopically connectable to couple said portions of the reach bar, said male and female parts being non-circular in cross-section to prevent rotation of one relative to the other along their common axis, said male and female parts having a space between opposed walls thereof on one side of said common axis and disposable on one side of said male part and having complementarily interengageable projection and dwell on an opposite side of said common axis of said male part and disposed at an angle to said common axis to prevent withdrawal of the male part from the female part upon relative longitudinal movement of one part away from the other part upon the projection being disposed in said dwell, and a locking member associated with said female and male parts movable laterally of said common axis to selectively hold said female and male parts in lateral positions relative to each other and in a direction away from said one side of said male part to maintain the said projection in said dwell and thereby prevent withdrawal of the male part from the female part in a longitudinal direction, and to selectively permit the female and male parts to move to lateral positions relative to each other for withdrawing the projection from the dwell and thereby allowing the withdrawal of the male part from the female part in a longitudinal direction.

7. A bicycle frame as claimed in claim 6 and in which said male and female parts are substantially rectangular in cross-section, and in which said projection comprises studs carried by the female part and directed inwardly thereof toward the axis thereof, and said dwell comprises openings in the wall of the male part dimensioned to complementarily receive the respective studs upon registration therewith and the lateral movement of the male and female parts together to insert the studs in the respective openings.

8. A bicycle frame as claimed in claim 7 and in which said locking member is a bolt threadably engaged to the female part and extending through a wall thereof, the bolt having a handle outside the female part for turning the bolt and having an engaging portion within the female part for bearing against a side of the male part upon the bolt being turned down.

9. A bicycle frame having a reach bar joining the steering post and seat post, said reach bar intermediate its ends having a rectangular portion in cross-section, the said rectangular portion being separable to permit separation of the reach bar into a front portion and a rear portion, the end of the front portion directed rearwardly being hollow and the end of the rear portion having a tongue of rectangular cross-section insertable in said hollow end of the front portion, a plurality of studs carried by a bottom wall of the front portion and spaced apart longitudinally thereof, said studs protruding into the hollow end of the front portion toward the top wall of the front portion, the tongue having a corresponding plurality of stud-receiving openings in the bottom wall thereof adapted to accommodate said studs upon registration therewith and generally vertical movement of the studs and tongue toward each other, said top wall of the front portion and top wall of the tongue having sufficient space therebetween when the studs are received in said openings to permit the tongue to be inserted longitudinally into, and to be withdrawn longitudinally out of, the hollow end of the front portion above the said studs upon the tongue and front portion being moved laterally relative to each other to withdraw the studs from the openings, and means selectively insertable in said space between the top wall of the front portion and the top wall of the tongue to hold the tongue downwardly in said hollow end of the front portion and thus maintain the said studs in said openings and prevent longitudinal withdrawal of the tongue from said hollow end of the front portion.

10. A frame as claimed in claim 9 and in which the facing ends of said front and end portions abut upon the said tongue being inserted in said hollow end of the front portion and said studs positioned in said openings, and in which said means selectively insertable in said space is a threaded bolt threaded to, and extending through, the top wall of said front portion and directed to bear upon the top wall of the said tongue upon being turned down.

11. In a bicycle frame, a reach bar of two separable portions, said portions adjacent the location of separation having rectangular cross-sections of substantially equal maximum areas and abutting end faces to present substantially continuous outer surfaces longitudinally of the reach bar at said location, the maximum dimensions of the rectangular cross-sections at said location being in vertical planes to provide maximum strength in said planes, a first of said portions having a socket of rectangular cross-section at the end directed toward the other of said portions, said other of said portions having a tongue of rectangular cross-section at the end directed toward the said first portion, said tongue being adapted to be inserted into, and withdrawn from, said socket upon movement of said first and second portions relative to each other in a path disposed longitudinally of said reach bar, said first portion having a projection protruding in a generally vertical direction upwardly into said socket, said tongue having an external vertical dimension less than the corresponding internal vertical dimension of said socket by an amount sufficient to permit the tongue to be inserted into, and withdrawn from, said socket, over the top of said projection, the said tongue having a recess in its bottom wall dimensioned to snugly accommodate said stud therein upon said tongue being moved down in said socket toward the bottom wall thereof, said projection in said recess preventing withdrawal of the tongue from said socket along said longitudinally disposed path, and manually releasable means carried by said reach bar for releasably restraining said tongue against said projection to maintain the said projection in said recess.

12. A reach bar as claimed in claim 11 and in which said manually releasable means comprises a threaded bolt threadably engaged to the top wall of said socket and extending upwardly from said first portion for external turning of the bolt, the bolt having an inner end directed to bear against the top wall of the tongue upon the bolt being turned down and to restrain the tongue against upward movement and thereby hold the said projection in said recess.

13. In a bicycle frame having a separable reach bar, a coupling construction for ready coupling and uncoupling forward and rearward portions of said reach bar, one of said portions having a socket and the other of said portions having a tongue insertable into and withdrawable from said socket in axial movement of one to the other, said socket having a bottom wall disposed at an incline downwardly toward the mouth of the socket, said tongue having a bottom wall disposed at an incline upwardly toward the end of the tongue and generally complementary to the said bottom wall of the socket, a projection extending inwardly of the socket and having an axis disposed normal to the said inclined bottom wall of the said socket having a bottom wall disposed at an incline bottom wall thereof, said opening having an axis normal to the said inclined bottom wall of the tongue, said projection complementarily fitting in said opening upon movement of the tongue and bottom wall of the socket toward each other, the up and down movement of the projection in said opening providing for a camming action moving the tongue outwardly and inwardly of the socket, and means for selectively locking the tongue downwardly in the socket to hold the projection in the opening and for permitting the tongue to move upwardly in the socket to allow the projection to clear the opening.

14. In a bicycle frame having a separable reach bar, a coupling construction for ready coupling and uncoupling forward and rearward portions of said reach bar, one of said portions at the end thereof having a longitudinal socket formed therein, said socket having a bottom wall disposed on a gradual incline upwardly and inwardly of the socket from said end, a plurality of studs carried by said bottom wall and extending inwardly of said socket, the respective axes of said studs being disposed substantially normal to said bottom wall, the sides of said studs directed toward said end and the sides of said studs directed away from said end being substantially parallel to the axes of the respective studs, the other of said portions having a tongue extending longitudinally therefrom, said tongue having a bottom wall disposed on a gradual incline from the free end thereof downwardly and longitudinally away from said free end, the bottom wall of said tongue and the bottom wall of said socket being substantially complementary upon insertion of the tongue into said socket and the movement of the bottom wall of the tongue toward the bottom wall of the socket, the bottom wall of said tongue having openings therein for complementarily receiving said studs in a sliding fit upon the tongue being moved in said socket toward the bottom wall, said socket having an open space therein above said tongue upon the tongue being positioned downwardly in the socket with the studs in said openings to provide space for the tongue to be moved longitudinally of the socket above the studs for clearing the studs from said openings, the said sides of said studs engaging the sides of said openings cammingly urging the tongue in a longitudinal direction relative to said socket upon the tongue moving upwardly and downwardly in the socket relative to the bottom wall thereof.

15. A coupling combination as claimed in claim 14, and including a member carried by the socket into the said space above said tongue therein and manipulatable toward and away from the tongue in said socket to selectively hold the tongue downwardly in the socket and the studs in said openings and to permit the tongue to move upwardly in the socket and the openings to clear said studs.

References Cited by the Examiner

UNITED STATES PATENTS

| 1,484,622 | 2/1924 | Claus | 287—104 |
| 2,440,091 | 4/1948 | Hoyt | 280—287 |
| 3,215,459 | 11/1965 | Baldwin | 280—287 X |
| 3,220,748 | 11/1965 | Moulton | 280—287 |

FOREIGN PATENTS 184,449  1/1956  Austria.

KENNETH H. BETTS, *Primary Examiner.*